United States Patent
Napier et al.

(10) Patent No.: US 11,536,110 B2
(45) Date of Patent: Dec. 27, 2022

(54) SEALING ELEMENT

(71) Applicant: Halliburton Energy Services, Inc., Houston, TX (US)

(72) Inventors: Rory Archibald Napier, Montrose (GB); Winston James Webber, Arbroath (GB); Chad William Glaesman, McKinney, TX (US); Timothy Alan Freeney, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 625 days.

(21) Appl. No.: 16/485,389

(22) PCT Filed: Jan. 28, 2019

(86) PCT No.: PCT/US2019/015346
§ 371 (c)(1),
(2) Date: Aug. 12, 2019

(87) PCT Pub. No.: WO2019/168621
PCT Pub. Date: Sep. 6, 2019

(65) Prior Publication Data
US 2020/0199966 A1 Jun. 25, 2020

Related U.S. Application Data

(60) Provisional application No. 62/636,027, filed on Feb. 27, 2018.

(51) Int. Cl.
*E21B 33/12* (2006.01)
*B33Y 10/00* (2015.01)
(Continued)

(52) U.S. Cl.
CPC ........ *E21B 33/1208* (2013.01); *B29C 64/106* (2017.08); *B33Y 10/00* (2014.12);
(Continued)

(58) Field of Classification Search
CPC ............. B29L 2031/26; B29K 2009/00; B29C 64/106; B33Y 10/00; B33Y 80/00;
(Continued)

(56) References Cited

U.S. PATENT DOCUMENTS

2008/0290603 A1 11/2008 Laflin
2016/0258242 A1* 9/2016 Hayter .................... E21B 34/06
(Continued)

FOREIGN PATENT DOCUMENTS

WO 2015091491 6/2015
WO 2015119602 8/2015
(Continued)

OTHER PUBLICATIONS

Netherlands Search Report and Written Opinion with English Translation for App No. 2022502 dated Apr. 14, 2021.
(Continued)

*Primary Examiner* — Moshe Wilensky
(74) *Attorney, Agent, or Firm* — Scott Richardson; C. Tumey Law Group PLLC

(57) ABSTRACT

This disclosure may generally relate to additive manufacturing operations and, more particularly, to systems and methods for three dimensional (3D) printing a sealing element. Specifically, examples of the present disclosure may be implemented to manufacture a sealing element which may be disposed in a wellbore to seal off a portion of a well.

20 Claims, 9 Drawing Sheets

(51) Int. Cl.
  *B33Y 80/00*   (2015.01)
  *B29C 64/106*  (2017.01)
  *E21B 33/128*  (2006.01)
  *B29K 9/00*    (2006.01)
  *B29L 31/26*   (2006.01)
  *E21B 33/129*  (2006.01)

(52) U.S. Cl.
  CPC ............ *B33Y 80/00* (2014.12); *E21B 33/128* (2013.01); *B29K 2009/00* (2013.01); *B29L 2031/26* (2013.01); *E21B 33/1293* (2013.01)

(58) Field of Classification Search
  CPC ............ E21B 33/1293; E21B 33/1216; E21B 33/1291; E21B 33/1208; E21B 33/128
  See application file for complete search history.

(56) References Cited

U.S. PATENT DOCUMENTS

| | | |
|---|---|---|
| 2016/0265305 A1 | 9/2016 | Davies |
| 2017/0096873 A1 | 4/2017 | VanLue |
| 2017/0342797 A1 | 11/2017 | Murphree et al. |
| 2017/0343108 A1 | 11/2017 | Hoang |
| 2018/0003001 A1 | 1/2018 | Pipchuk et al. |
| 2018/0296343 A1* | 10/2018 | Wei ........................ B29C 64/241 |
| 2020/0086554 A1* | 3/2020 | Hou ....................... B29C 64/393 |

FOREIGN PATENT DOCUMENTS

| | | |
|---|---|---|
| WO | 2016133498 A1 | 8/2016 |
| WO | 2016140748 A1 | 9/2016 |
| WO | 2017039619 | 3/2017 |
| WO | 2017100451 | 6/2017 |
| WO | 2017160265 | 9/2017 |
| WO | 2009098467 | 8/2019 |

OTHER PUBLICATIONS

ISRWO International Search Report and Written Opinion for PCT/US2019/015346 dated May 1, 2019.

"Inject Printing," Custompart.net, available at http://www.custompartnet.com/wu/ink-jet-printing, available Jan. 2018.

India Search Report and Written Opinion with English Translation for App No. 202027031835 dated Aug. 2, 2021.

China Office Action with English Translation for App No. 201980008442.1 dated Jul. 21, 2022.

* cited by examiner

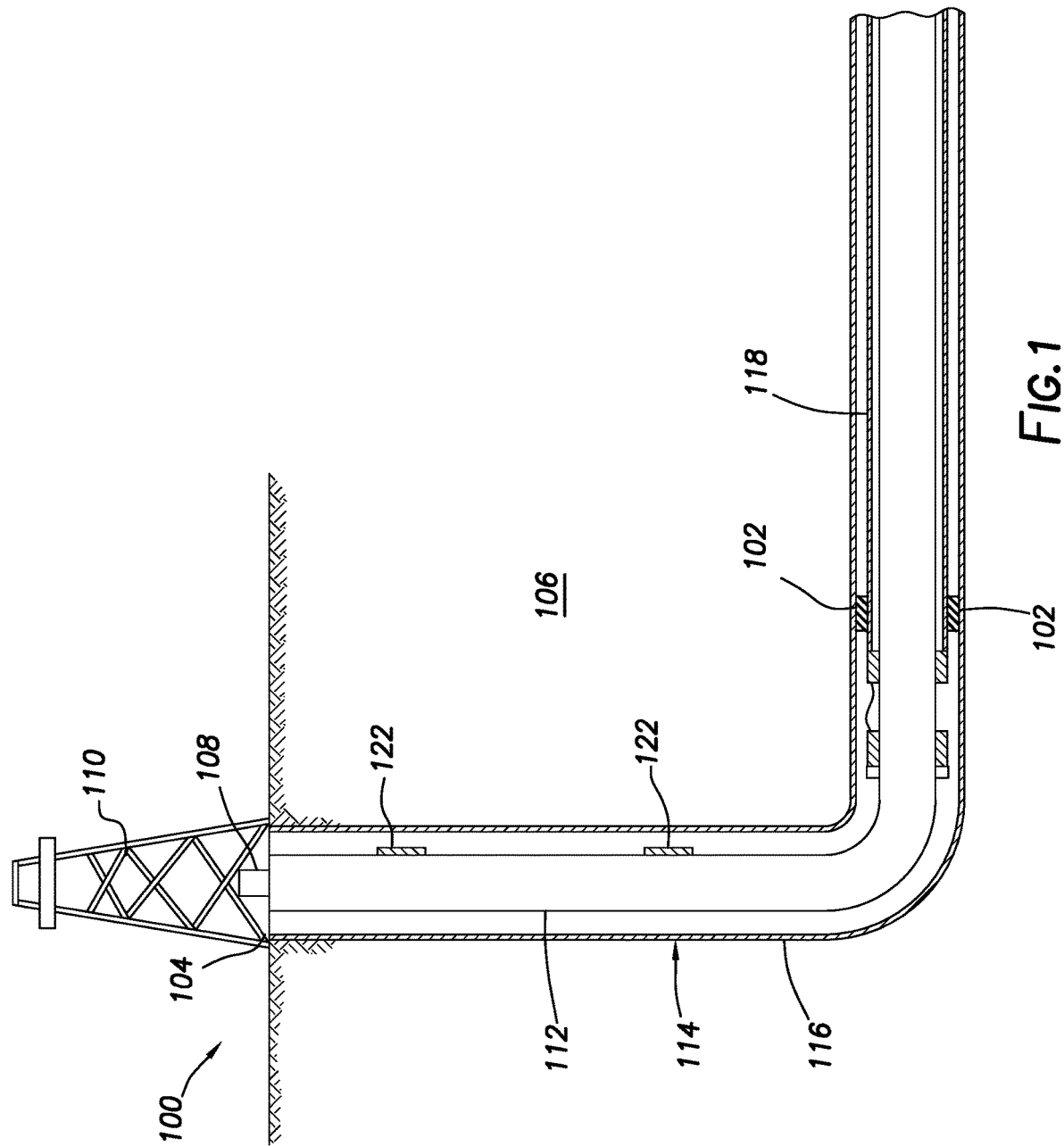

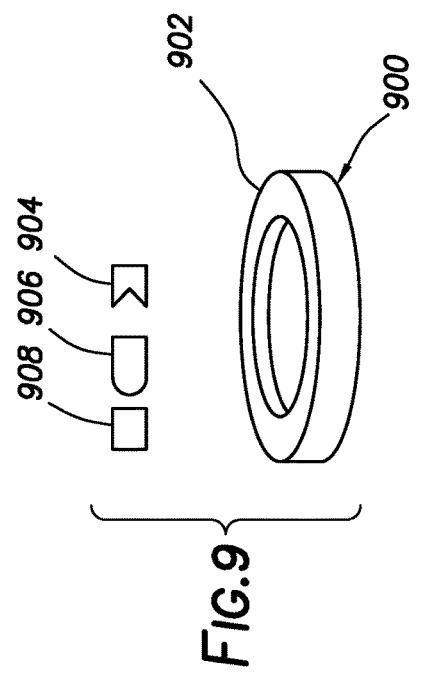
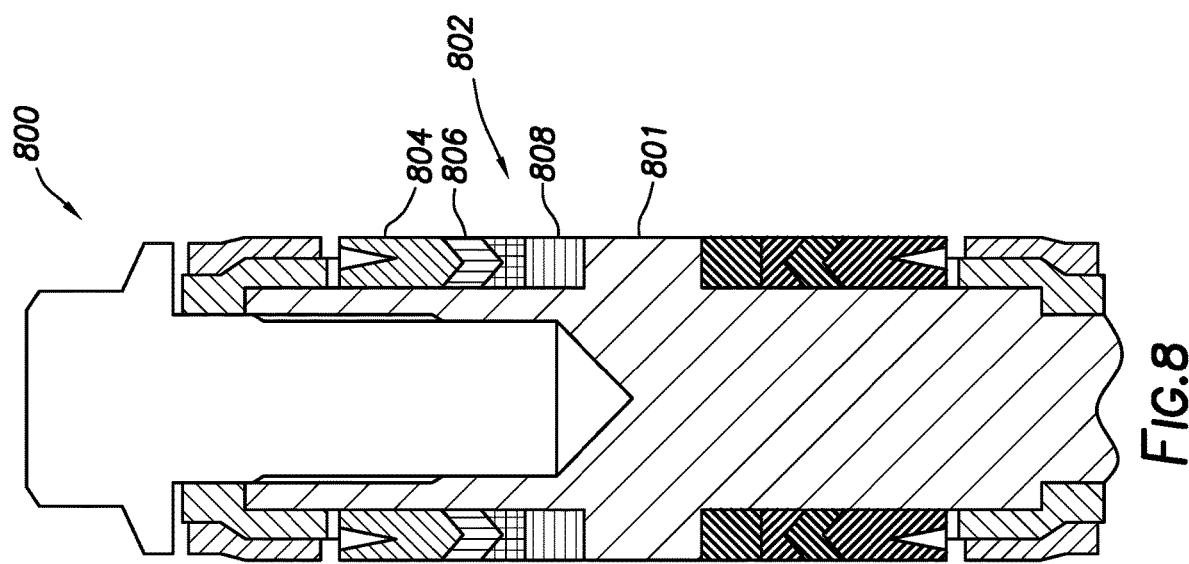

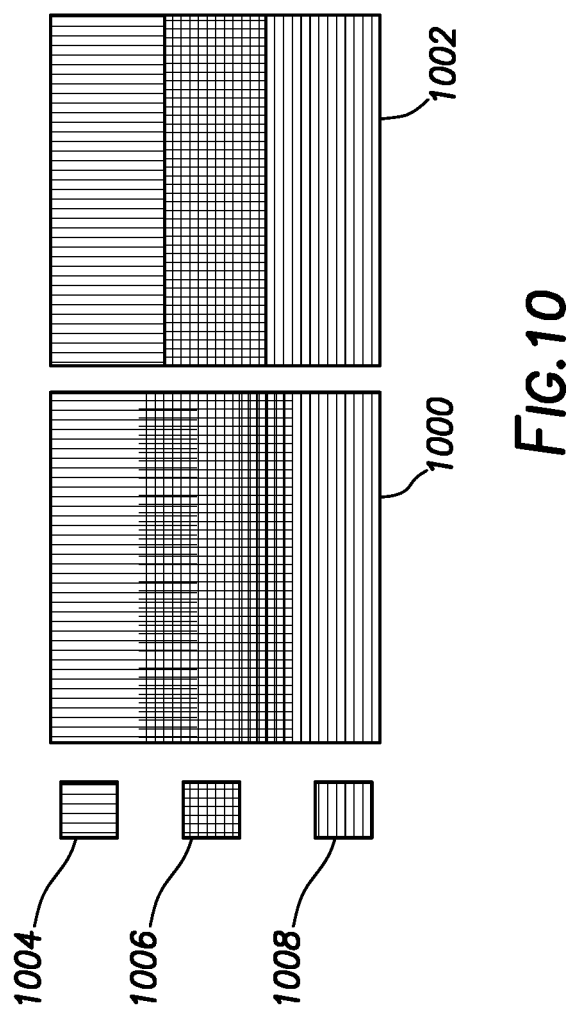

SEALING ELEMENT

BACKGROUND

Wells may be drilled into subterranean formations to recover valuable hydrocarbons. Various operations may be performed before, during, and after the well has been drilled to produce and continue the flow of the hydrocarbon fluids to the surface.

A typical operation concerning oil and gas operations may be to apply a seal within a well. A seal may isolate and contain produced hydrocarbons and pressures within the well. There may be a variety of different tools and equipment used to create seals between the outside of a production tubing string and the inside of a casing string, liner, or the wall of a wellbore. Substantial pressure differentials across a seal may induce failure of the seal and may result in substantial loss of time, money, and equipment, and may even result in harm to individuals. Additionally, expanding a wellbore seal may induce substantial deformation and internal stress on a sealing element, which may increase the chance of failure (e.g., due to breaking or tearing). The design and manufacture of wellbore seals may be limited in structure and material choice in order to minimize the chance of failure. It may be suitable to explore alternative manufacturing processes to produce improved sealing elements.

BRIEF DESCRIPTION OF THE DRAWINGS

These drawings illustrate certain aspects of the present disclosure and should not be used to limit or define the disclosure.

FIG. 1 illustrates an example of a downhole system;
FIG. 8 illustrates an example of a downhole tool;
FIG. 9 illustrates an example of a seal;
and
FIG. 10 illustrates an example of a material configuration.

DETAILED DESCRIPTION

Figures 2A, 3A:
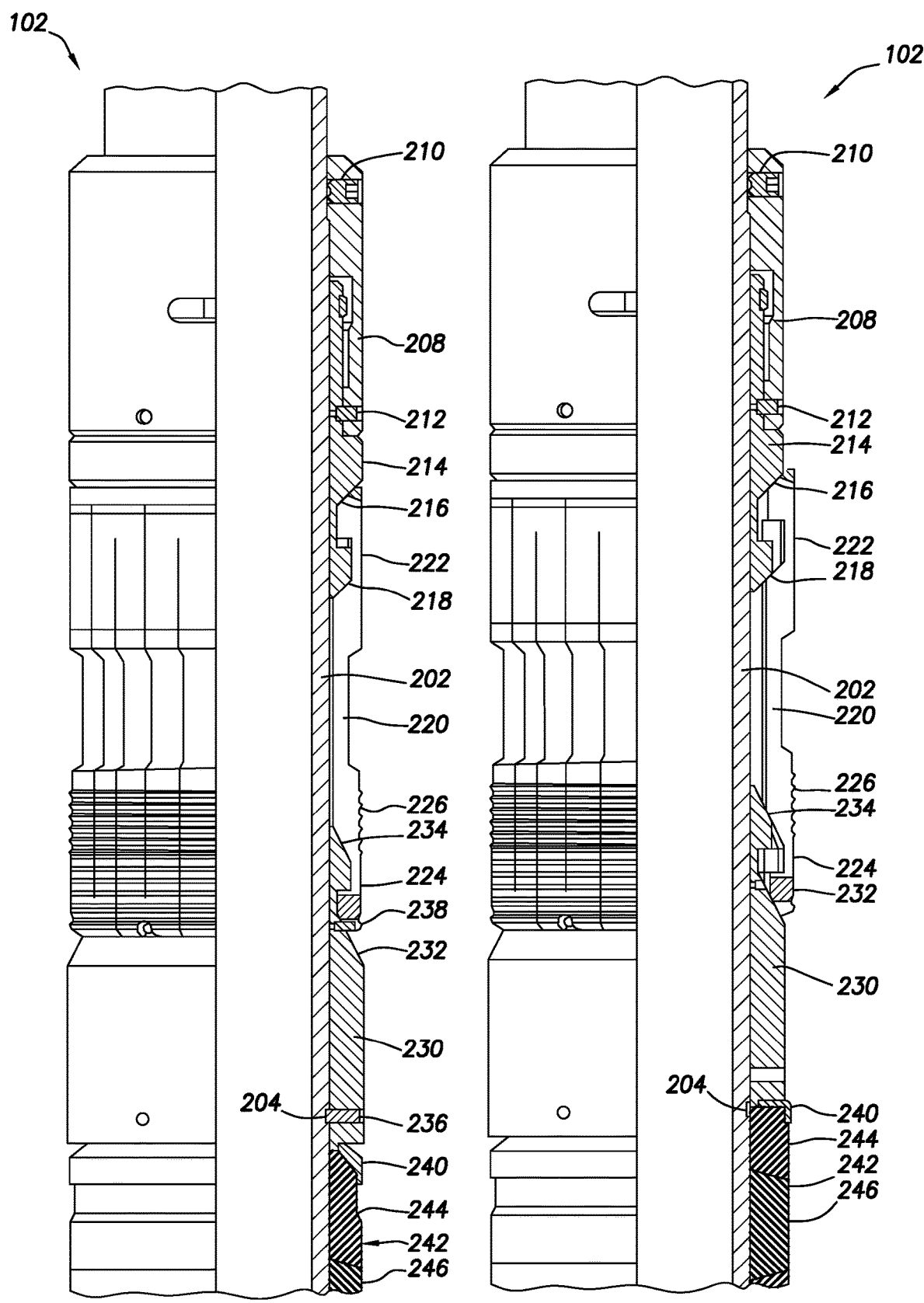
FIGS. 2A-2C illustrate an example of a packer.
FIGS. 3A-3C illustrate an example of a packer

This disclosure may generally relate to additive manufacturing operations and, more particularly, to systems and methods for three dimensional (3D) printing a sealing element. Specifically, examples of the present disclosure may be implemented to manufacture a sealing element which may be disposed in a wellbore to seal off a portion of a well. Advantageously, the sealing element may include an additive manufactured object having a first material and a second material that are different form one another. As used herein, the first material and the second material are considered different from one another if they have a different chemical composition, structure, or other property. The properties of the first material and the second material may be tailored, for example, to optimize performance of the sealing element. Any number of different properties of the first material and the second material may be tailored, including, but not limited to, hardness, elasticity, gas resistance, chemical resistance, high temperature strength, density, thermal expansion rates, and coefficient of friction, among others.

A system and method may be used to manufacture a sealing element. The sealing element may be used in any suitable tool or equipment. Without limitation, suitable tools or equipment may include packers, sealing stacks, safety valves, plugs, landing nipples, and/or combinations thereof. It should be noted that while the implementation of the sealing element within a packer will be discussed more in detail, those skilled in the art will readily recognize that the principles describe herein are equally applicable to any equipment using seals and/or used to create seals, without departing from the scope of the disclosure.

The sealing elements disclosed herein may be manufactured using any of a variety of suitable additive manufacturing processes. The term "additive manufacturing" refers to any of a variety of technologies that grow three-dimensional objects one layer at a time wherein each successive layer bonds to the preceding layer, which may be melted or partially melted material. Additive manufacturing may also be referred to as 3D printing and includes a variety of different manufacturing processes, including, but not limited to, material extrusion, directed energy deposition, material jetting, binder jetting, sheet lamination, vat polymerization, and power bed fusion. Suitable materials that may be used in the additive manufacture of the sealing elements may include, but are not limited to, thermoplastics, ceramics, and metals, among others. Examples of suitable thermoplastics may include, but are not limited to, polyacetals (e.g., polyoxyethylene and polyoxymethylene), poly(Ci-6 alkyl)acrylates, polyacrylamides, polyamides, (e.g., aliphatic polyamides, polyphthalamides, and polyaramides), polyamideimides, polyanhydrides, polyarylene ethers (e.g., polyphenylene ethers), polyarylene sulfides (e.g., polyphenylene sulfides), polyarylenesulfones (e.g. polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetheretherketones, polyetherimides (including copolymers such as polyetherimide-siloxane copolymers), polyetherketones, polyethersulfones, polyaryl ether ketones, polyimides (including copolymers such as polyimide-siloxane copolymers), poly(Ci-6 alkyl)methacrylates, polymethacrylamides, polynorbomenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrilebutadiene- styrene (ABS) and methyl methacrylate-butadiene-styrene (MBS)) polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, polylactic acid, polyglycolic acid, poiy-3-hydroxybutyrate, polyhydroxyalkanoate, thermoplastic starch, cellulose ester, silicones, or the like, or a combination including at least one of the foregoing polymers.

As previously described, any number of different properties of the first material and the second material may be tailored, for example. to provide a sealing element with desirable properties. By way of example, through the use of additive manufacturing, two or more different materials may be used in the sealing element enabling customization of performance and functionality for the sealing element. As will be appreciated, the materials, their blend ratios, and/or their orientation of deposit may be selected to achieve a desired performance. The properties that can be tailored may include, but are not limited to, hardness, elasticity, gas resistance, chemical resistance, and high temperature strength, among others. In some embodiments, a first material that is strong but inflexible may be combined with a second material that is flexible but weak to provide a sealing element that exhibits bulk performance. In other embodiments, a first material having a first hardness may be combined with a second material having a second hardness to provide a multi-durometer sealing element.

In some embodiments, the sealing element may include a first material and the second materials may have different hardnesses. Different hardness of the first material and the second material may be used, for example, to provide a multi-durometer sealing element. By way of example, the first material and the second material may vary by 5 A, 10 A, 20 A, or more on the Shore A scale. The Shore A Hardness Scale is a scale from 0 to 100 measures the hardness of flexible mold rubbers that can range in hardness from very soft and flexible to hard with no flexibility.

FIG. 1 illustrates a downhole system 100 that includes a packer 102. Surface equipment 104 may be disposed above a formation 106. As illustrated, surface equipment 104 may include a hoisting apparatus 108 and a derrick 110. Hoisting apparatus 108 may be used for raising and lowering pipe strings, such as a conveyance line 112. Conveyance line 112 may include any suitable means for providing mechanical conveyance for packer setting assembly 102, including, but not limited to, wireline, slickline, coiled tubing, tubing string, pipe, drill pipe, drill string or the like. In some examples, conveyance line 112 may provide mechanical suspension, as well as electrical connectivity, for downhole tools. As illustrated, downhole tools may be disposed on and/or around conveyance line 112. This may allow an operator to actuate packer 102 to seal off a portion of a wellbore 114.

As illustrated, downhole tools may be run into wellbore 104 on conveyance line 112. Wellbore 114 may extend through the various earth strata including formation 106. A casing 116 may be secured within wellbore 114 by cement (not shown). Casing 116 may be made from any material such as metals, plastics, composites, or the like, may be expanded or unexpanded as part of an installation procedure. Additionally, it is not necessary for casing 116 to be cemented into wellbore 114. In examples, production tubing 118 may be secured within casing 116. Production tubing 118 may be any suitable tubing string utilized in the production of hydrocarbons. In examples, production tubing may be permanently disposed within casing 116 by cement (not shown). Packer 102 may be disposed on or near production tubing 118.

Without limitation, any suitable type of packer 102 may be used. Suitable types of packers may include whether they are permanently set or retrievable, mechanically set, hydraulically set, and/or combinations thereof. As will be discussed in more detail below, packer 102 may include one or more sealing elements (e.g., expandable seal elements 244, 246, 248) that can be additive manufactured to provide optimized performance. Packer 102 may be set downhole to seal off a portion of wellbore 114. When set, packer 102 may isolate zones of the annulus between wellbore 114 and a tubing string by providing a seal between production tubing 118 and casing 116. In examples, packer 102 may be disposed on production tubing 118. The downhole tools may be disposed around conveyance line 112 and run into wellbore 114 when desired to actuate packer 102. Downhole tools may temporarily couple to packer 102 to initiate a sealing operation within wellbore 114.

It should be understood by those skilled in the art that present examples are equally well suited for use in wellbores having other directional configurations including vertical wellbore, horizontal wellbores, deviated wellbores, multi-lateral wells and the like. Accordingly, it should be understood by those skilled in the art that the use of directional terms such as above, below, upper, lower, upward, downward, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well. Also, even though FIG. 1 depicts an onshore operation, it should be understood by those skilled in the art that the packer of the present invention is equally well suited for use in offshore operations. In addition, while FIG. 1 depicts use of packer 102 in a cased portion of wellbore 114, it should be understood that packer 102 may also be used in uncased portions of wellbore 114.

Figure 2B:
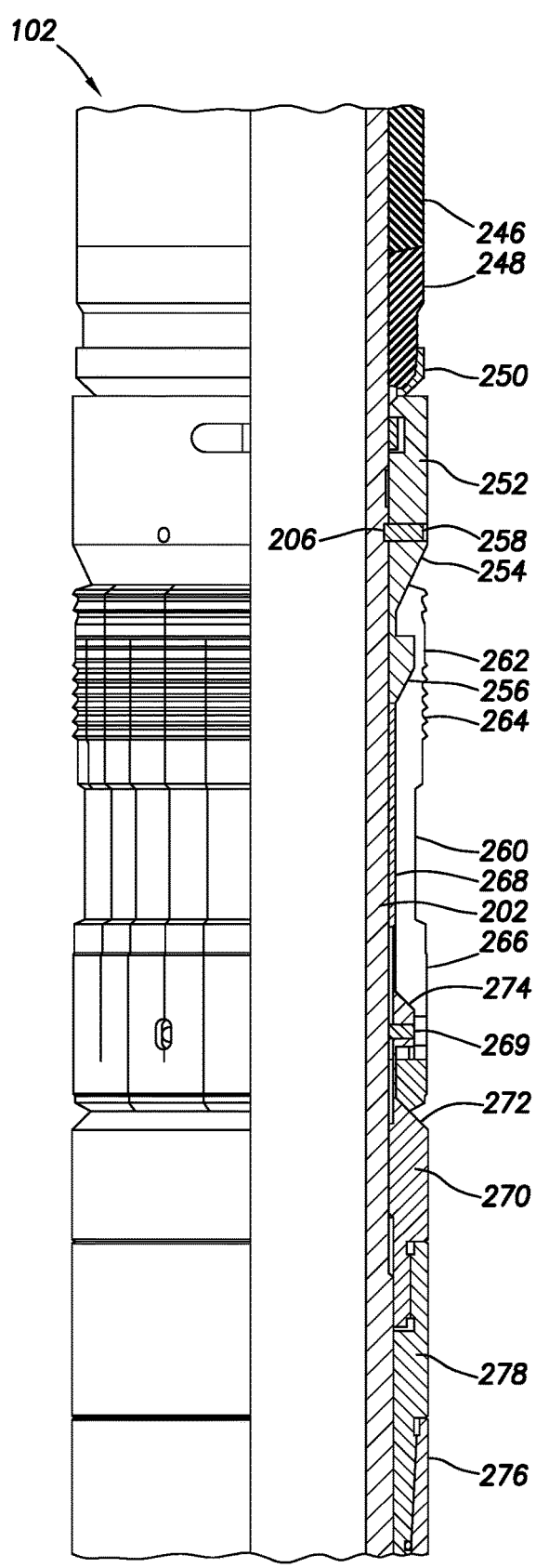
Figure 3B:
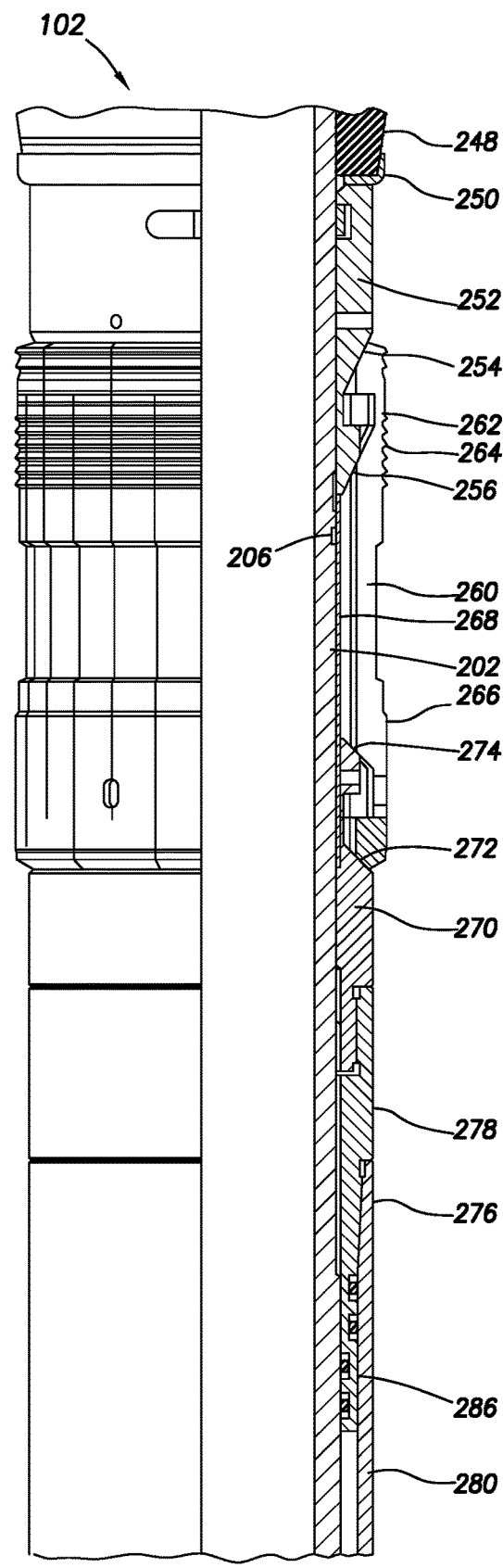
Figure 2C:
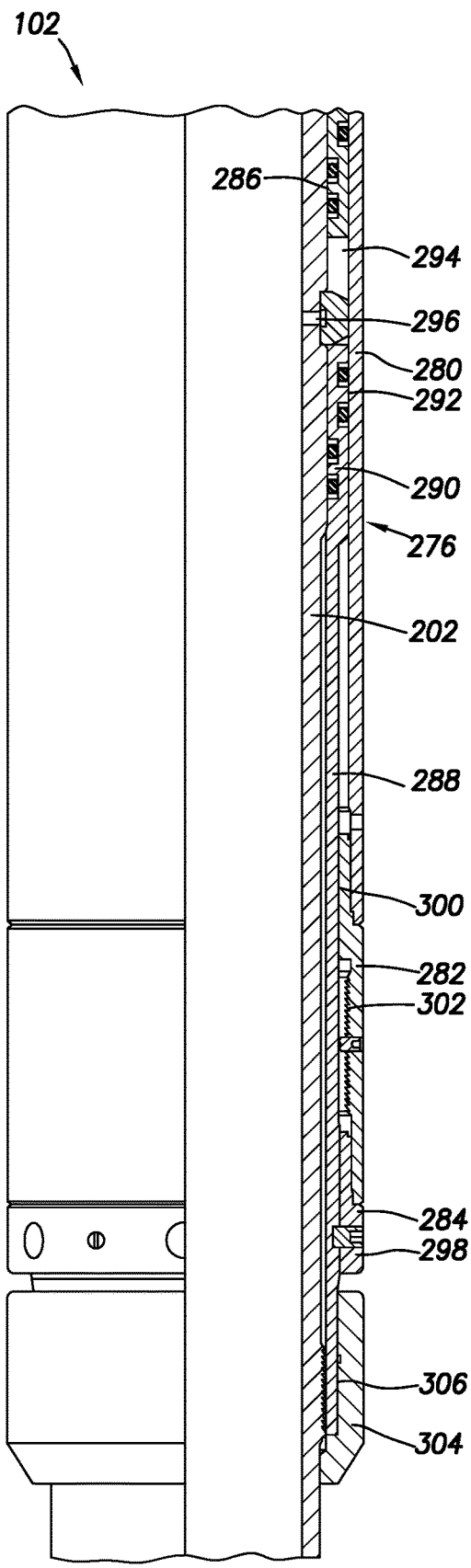
Figure 3C:
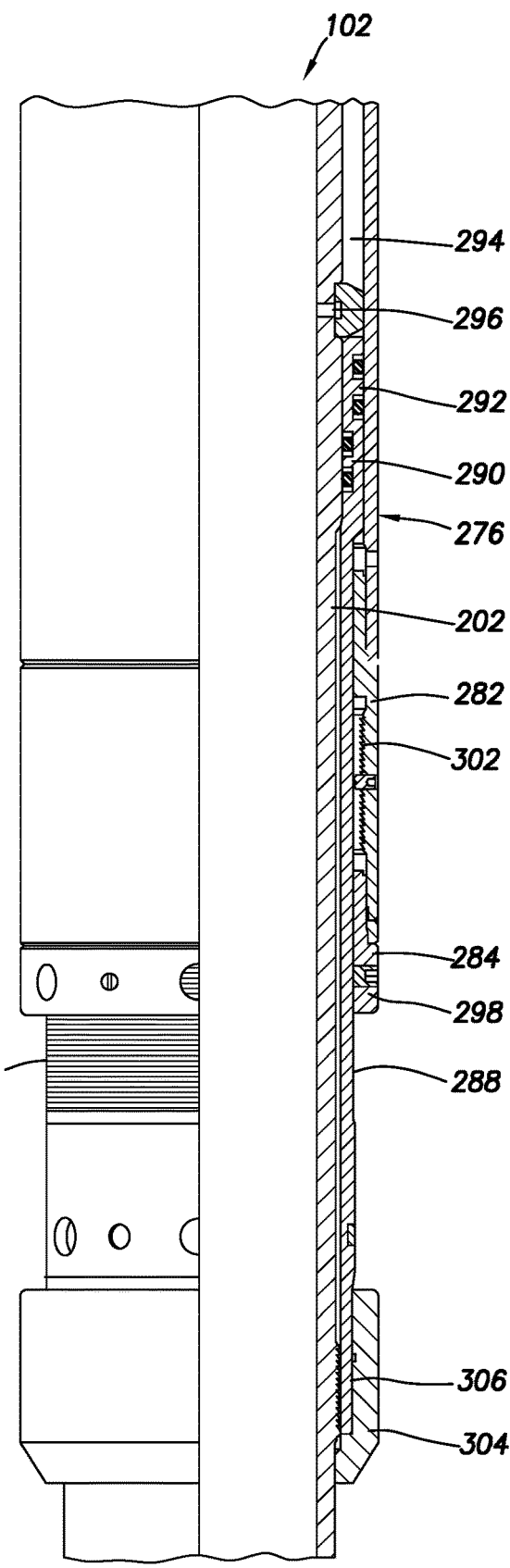

Referring now to FIGS. 2A-2C, therein are depicted successive axial sections of packer 102. Without limitations, any suitable type of packer may be used. Suitable types of packers may include whether they are permanently set or retrievable, mechanically set, hydraulically set, and/or combinations thereof. Packer 102 may be threadably coupled to other downhole tools as part of conveyance line 110 (referring to FIG. 1). Packer 102 may include a packer mandrel 202. Packer mandrel 202 may include a pin groove 204, as best seen in FIG. 2A and a pin groove 206, as best seen in FIG. 2B. Positioned around an upper portion of packer mandrel 202 may be an upper housing section 208 that may be threadably coupled to packer mandrel 202. One or more threaded pins 210 may be used to secure upper housing section 208 against rotation. At its lower end, upper housing section 208 may be securely coupled by one or more pins 212 to a first wedge 214 that may be disposed about packer mandrel 202. First wedge 214 may include a pair of ramps 216, 218 that may be operable to engage an inner surface of an upper slip element 220 that may be disposed about packer mandrel 202. Upper slip element 220 may include a substantially cylindrical, non-directional contact surface 222 for diverting force to the wall of wellbore 116 (referring to FIG. 1) when set and a substantially cylindrical, directional gripping surface 224 depicted as including a plurality of teeth 226 for providing a gripping arrangement with the interior of the wall of wellbore 116 when set. As illustrated, upper slip element 220 is located between first wedge 214 and a second wedge 230 that may include a pair of ramps 232, 234. In the running configuration of packer 102 depicted in FIGS. 2A-2C, second wedge 230 may be securely coupled to packer mandrel 202 by one or more pins 236. In addition, upper slip element 220 may be prevented from moving up ramp 232 of second wedge 230 by one or more pins 238. As explained in greater detail below, when a compressive force is generated between first wedge 214 and second wedge 230, upper slip element 220 may be radially expanded into contact with the wall of wellbore 116.

An upper element backup shoe 240 that may be slidably positioned around packer mandrel 202 may be adjacent to second wedge 230. Additionally, a seal assembly 242, depicted as expandable seal elements 244, 246, 248, may be slidably positioned around packer mandrel 202 between upper element backup shoe 240 and a lower element backup shoe 250. Even though three expandable seal elements 244, 246, 248 are depicted and described, those skilled in the art will recognize that a seal assembly of the packer of the present invention may include any number of seal elements. One or more of expandable seal elements 244, 246, 248 may be additive manufactured to include a first material and a second material, as previously described. By additive manufacturing, the properties of the one or more of the expandable seal elements 244, 246, 248 may be tailored to provided improved performance.

Upper element backup shoe 240 and lower element backup shoe 250 may be made from a deformable or malleable material, such as mild steel, soft steel, brass and the like and may be thin cut at their distal ends. The ends of upper element backup shoe 240 and lower element backup shoe 250 may deform and flare outwardly toward the inner surface of the wall of wellbore 116 during setting. In an example, upper element backup shoe 240 and lower element backup shoe 250 may form metal-to-metal barriers between packer 102 and the inner surface the wall of wellbore 116 (referring to FIG. 1).

A third wedge 252 may be disposed about packer mandrel 202 and include a pair of ramps 254, 256. In the running configuration of packer 102 depicted in FIGS. 2A-2C, third wedge 252 may be securely coupled to packer mandrel 202 by one or more pins 258. A lower slip element 260 that may be disposed about packer mandrel 202 may be below third wedge 252. Lower slip element 260 may include a substantially cylindrical, directional gripping surface 262 depicted as including a plurality of teeth 264 for providing a gripping arrangement with the interior of the wall of wellbore 116 when set and a substantially cylindrical, non-directional contact surface 266 for diverting force to the wall of wellbore 116 when set. A force ring 268 may be disposed between lower slip element 260 and packer mandrel 202. Lower slip element 260 may be located between third wedge 252 and a fourth wedge 270 that may include a pair of ramps 272, 274 that may be operable to engage an inner surface of lower slip element 260. Initially, fourth wedge 270 may be coupled to force ring 268 by one or more pins 269. As explained in greater detail below, when a compressive force is generated between third wedge 252 and wedge 270, lower slip element 260 may be radially expanded into contact with the wall of wellbore 116.

A setting piston assembly 276 may be slidably disposed about packer mandrel 202 and coupled to fourth wedge 270 through a threaded connection. In the illustrated example, piston assembly 276 may include an upper piston section 278, an intermediate piston section 280 that may be threadably and sealingly coupled to upper piston section 278, a lower piston section 282 that may be threadably coupled to intermediate piston section 280, and a retainer ring 284 that may be threadably coupled to lower piston section 282. Even though piston assembly 276 is depicted and described as having a particular number of sections, those skilled in the art will recognize that other arrangements of piston sections including a greater number or lesser number of piston sections including a single piston section could alternatively be used in the present invention. Upper piston section 278 may include a sealing profile 286 having multiple sealing elements that provide a seal with packer mandrel 202.

A lower cylinder 288 may be disposed between packer mandrel 202 and the lower sections of piston assembly 276. Lower cylinder 288 may include a sealing profile 290 having multiple sealing elements that may provide a seal with packer mandrel 202. Lower cylinder 288 may also include a second sealing profile 292 having multiple sealing elements that provide a seal with intermediate piston section 280. Packer mandrel 202 and intermediate piston section 280, as well as the seals of upper piston section 278 and lower cylinder 288, may define a setting chamber 294 that may be in fluid communication with one or more fluid ports 296 that extend through packer mandrel 202. Retainer ring 284 may be initially coupled to lower cylinder 288 by one or more frangible members depicted as shear screws 298. Lower cylinder 288 may include a serrated outer surface 300 that may be operable to interact with a body lock ring 302 disposed between lower cylinder 288 and lower piston section 282. At its lower end, lower cylinder 288 may be threadably coupled to a lower housing section 304. A lock ring 306 may be disposed between lower housing section 304 and packer mandrel 202 that may secure lower housing section 304 onto packer mandrel 202.

FIGS. 2A-2C and 3A-3C collectively illustrate an operating mode of packer 102 Packer 102 may be depicted before and after activation and expansion of expandable seal elements 244, 246, 248 and slip elements 220, 260, respectively, in FIGS. 2A-2C and 3A-3C. Packer 102 may be run into wellbore 116 on conveyance line 110 (referring to FIG. 1) to a desired depth and then set against a casing string, a liner string or wall of wellbore 116. Setting may be accomplished by increasing the tubing pressure within packer mandrel 202 and setting chamber 294 to an actuation pressure sufficient to upwardly shift setting piston assembly 276. The force generated by the fluid pressure acting on a lower surface of setting piston assembly 276 may break the shear screws 298 allowing setting piston assembly 276 to move upwardly relative to lower cylinder 288 and packer mandrel 202.

The upwardly directed force may break pins 258 and pins 236, thereby releasing slip elements 220, 260 from packer mandrel 202. The upwardly moving setting piston assembly 276 may cause second wedge 230 to move toward first wedge 214, causing slip element 220 to be radially outwardly shifted by ramps 216, 218, 232, 234, which set slip element 220 against the setting surface of wellbore 116. As slip element 220 sets, greater force may be applied between second wedge 230 and third wedge 252. This may apply a compressive force against seal assembly 242, which causes radial expansion of seal elements 244, 246, 248 against the sealing surface of wellbore 116. In addition, the compressive forces may cause upper element backup shoe 240 and lower element backup shoe 250 to flare outward toward the sealing surface to provide a metal-to-metal seal against a casing or liner string (i.e., if wellbore 116 is cased). As seal assembly 242 sets, greater force may be applied between fourth wedge 270 and force ring 268, which may break pins 269 releasing wedge 270 from force ring 268. The upwardly moving setting piston assembly 276 may cause fourth wedge 270 to move toward third wedge 252, causing slip element 260 to be radially outwardly shifted by ramps 254, 256, 272, 274, which may set slip element 260 against the setting surface of wellbore 116. After setting, downward movement of piston assembly 276 may be prevented due to the interaction of body lock ring 302 and serrated outer surface 300 of lower cylinder 288.

In this manner, packer 102 may create a sealing relationship between seal elements 244, 246, 248 and the sealing surface of wellbore 116 (referring to FIG. 1). In addition, packer 102 may create a gripping relationship between directional gripping surface 224 of slip element 220, directional gripping surface 262 of slip element 260 and setting surfaces of wellbore 116. Further, packer 102 may create a contact relationship between non-directional contact surface 222 of slip element 220, non-directional contact surface 266 of slip element 260 and setting surfaces of wellbore 116. In this set configuration, directional gripping surface 224 of slip element 220 may oppose movement of slip element 220 in the uphole direction, and directional gripping surface 262 of slip element 260 may oppose movement of slip element 260 in the downhole direction. In addition, non-directional contact surface 222 of slip element 220 may divert force acting on slip element 220 in the downhole direction to the wellbore, and non-directional contact surface 266 of slip element 260 may divert force acting on slip element 260 in the uphole direction of wellbore 116.

In some embodiments, one or more of expandable seal elements 244, 246, 248 may be produced by a suitable additive manufacturing process. Typically, seal elements 244, 246, 248 may include a singular rubber material. In accordance with present embodiments, one or more of seal elements 244, 246, 248 may include a first material and as second material. Through the use of additive manufacturing, two or more different materials may be used in the sealing elements 244, 246, 248 enabling customization of performance and functionality for the sealing element. The properties of the sealing elements 244, 246, 248 that can be tailored may include, but are not limited to, hardness, elasticity, gas resistance, chemical resistance, and high temperature strength, among others. For example, by blending the two different materials via additive manufacturing, embodiments may provide seal elements 244, 246, 248 with additional strength, allowing for the integrity of seal elements 244, 246, 248 to endure for a longer amount of time when in operation. Currently, seal elements 244, 246, 248 may be limited to repeating patterns of various suitable materials to provide necessary performance. In examples, seal elements 244, 246, 248 may include distinct boundaries between different materials, which may be assembled through bonding. In some embodiments, where a suitable additive manufacturing process is used, a user may be able to selectively place a suitable material in relation to another suitable material. Rather than including distinct boundaries, seal elements 244, 246, 248 may be produced with no distinct boundaries between the first material and the second materials such that is a dispersed zone of the first material and the second material between adjacent materials. Accordingly, additive manufacturing may facilitate enhanced properties within seal elements 244, 246, 248 by allowing integration between adjacent materials rather than an abrupt change in materials. In examples, a dispersed zone may be produced through a 3D printing process.

Figure 4:
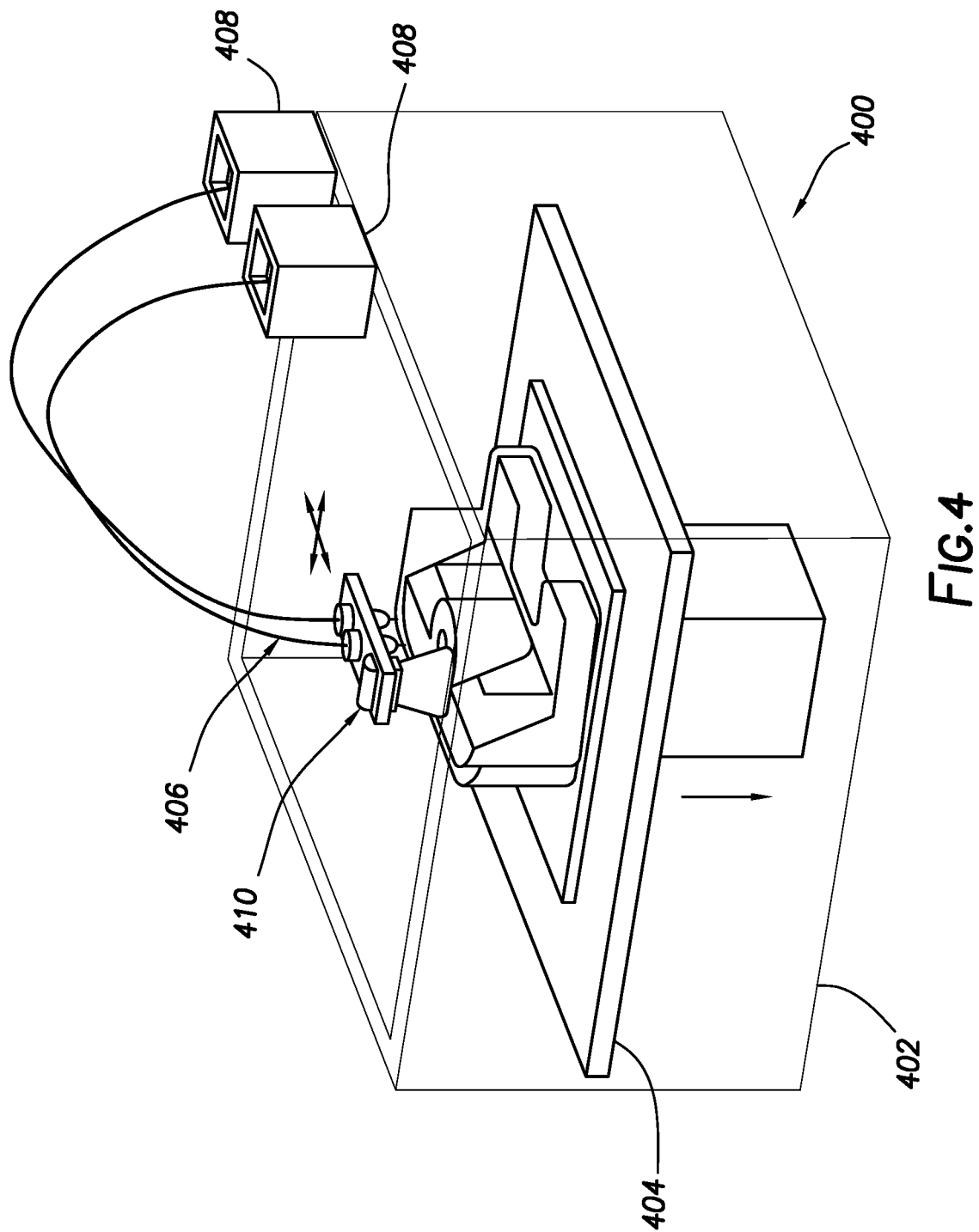
FIG. 4 illustrates an example of a 3D printer.

FIG. 4 illustrates a three-dimensional (3D) printer 400. It should be understood that 3D printer 400 shown on FIG. 4 is merely exemplary and any suitable device may be used to generate the additive manufactured objects in accordance with present embodiments. 3D printer 400 may be used to construct an additive manufactured object having a first material and a second material that are different form one another. As discussed, 3D printer 400 may operate and function to construct seal elements 244, 246, 248 as the additive manufactured object. Seal elements 244, 246, 248 may be any suitable size, height, and/or shape. Without limitation, a suitable shape may include, but is not limited to, cross-sectional shapes that are circular, elliptical, triangular, rectangular, square, hexagonal, D-shaped, V-shaped, and/or combinations thereof. In examples, 3D printer 400 may deposit a material layer by layer to construct the three-dimensional object. Typically, 3D printer 400 may require a model to base operation on. In examples, computer-aided design (CAD) may be employed to create a model that the 3D printer may use to produce a desired object. An operator may use CAD software, a 3D scanner, and/or combinations thereof to create the model to be printed. Any suitable CAD software program may be used. Typically, a 3D scanner may collect digital data on the shape and appearance of an existing object and save it as file that is compatible with 3D printer 400. Without limitation, the model may be saved as an STL file or an AMF file. In examples, the saved file may cause components within 3D printer 400 to operate to produce a deposited layer of material. 3D printer 400 may use various processes to construct seal elements 244, 246, 248. Without limitation, 3D printer 400 may use selective laser sintering, vat photopolymerization, fused deposition, modeling, binder jetting, and/or combinations thereof 3D printer 400 may include a frame 402, a bed plate 404, an extruder 406, and a material container 408.

Frame 402 may be a structural supporting system for 3D printer 400. Frame 402 may include a plurality of individual members that are rigidly connected together. In examples, the plurality of individual members may be connected to each other through using any suitable mechanism, including, but not limited, through the use of suitable fasteners, threading, adhesives, welding and/or any combination thereof. Without limitation, suitable fasteners may include nuts and bolts, washers, screws, pins, sockets, rods and studs, hinges and/or any combination thereof. Frame 402 may be any suitable size, height, and/or shape. Without limitation, a suitable shape may include, but is not limited to, cross-sectional shapes that are circular, elliptical, triangular, rectangular, square, hexagonal, and/or combinations thereof. In examples, frame 402 may have both rectangular and square cross-sectional shapes. Frame 402 may be made from any suitable material. Suitable materials may include, but are not limited to, metals, nonmetals, polymers, ceramics, and/or combinations thereof.

In examples, bed plate 404 may be disposed within frame 402. Bed plate 404 may be the surface upon which an additive manufactured object is produced. Bed plate 404 may be any suitable size, height, and/or shape. Without limitation, a suitable shape may include, but is not limited to, cross-sectional shapes that are circular, elliptical, triangular, rectangular, square, hexagonal, and/or combinations thereof In examples, bed plate 404 may have a square cross-sectional shape. Bed plate 404 may be made from any suitable material. Suitable materials may include, but are not limited to, metals, nonmetals, polymers, ceramics, and/or combinations thereof. Bed plate 404 may be coated with a substance to prevent the adhesion of a deposited material onto bed plate 404. Bed plate 404 may be actuated to move along a line of motion. Typically, bed plate 404 may move closer to and/or further away from extruder 406.

Extruder 406 may be the component of 3D printer 400 wherein material flows through. In examples, as 3D printer 400 operates, material may flow through extruder 406 onto bed plate 404. Extruder 406 may be any suitable size, height, and/or shape. Without limitation, a suitable shape may include, but is not limited to, cross-sectional shapes that are circular, elliptical, triangular, rectangular, square, hexagonal, and/or combinations thereof. Extruder 406 may be made from any suitable material. Suitable materials may include, but are not limited to, metals, nonmetals, polymers, ceramics, and/or combinations thereof. There may be a plurality of extruders 106 within 3D printer 400. In examples, extruder 406 may include a motor and a nozzle. Typically, a stepper motor may be used, but any suitable motor may be used within 3D printer 400. In examples, the motor may be actuated to move a material through the nozzle. In examples, any suitable nozzle may be used to control the outgoing flow of material. As the material deposits from the nozzle, the material may be induced to solidify through electromagnetic radiation. In examples, extruder 406 may also include an ultraviolet (UV) source 410 that emits electromagnetic radiation.

UV source 410 may be disposed adjacent to any suitable nozzle within extruder 406. UV source 410 may expose a suitable material to electromagnetic radiation. UV source 410 may include any suitable UV lamp and/or any suitable power source to produce electromagnetic radiation. In examples, the suitable material may undergo polymerization initiated by the absorption of the electromagnetic radiation. The polymerization process may change the properties of the suitable material. UV source 410 may be any suitable size, height, and/or shape. Without limitation, a suitable shape may include, but is not limited to, cross-sectional shapes that are circular, elliptical, triangular, rectangular, square, hexagonal, and/or combinations thereof. UV source 410 may be made from any suitable material. Suitable materials may include, but are not limited to, metals, non-metals, polymers, ceramics, and/or combinations thereof. There may be a plurality of UV sources 110 within extruder 406. In alternate examples, UV source 410 may be disposed at any location within and/or on 3D printer 400, so long as the emitted electromagnetic radiation is able to reach the deposited material from 3D printer 400. The material that may undergo photopolymerization, wherein the polymerization is triggered by the absorption of light, may be housed in material container 408. In examples, the material may undergo a phase change (i.e., from liquid to solid).

Material container 408 may contain the material to be used for printing. Any suitable type of material may be used. There may be a plurality of material containers 408 and/or subsequent suitable material which may reside in each material container 408. Depending upon the specific process utilized, the suitable type of material may vary. Typically, thermoplastics may be used in fused deposition modeling such as acrylonitrile butadiene styrene (ABS), polylactic acid (PLA), high-impact polystyrene (HIPS), thermoplastic polyurethane (TPU), aliphatic polyamides (nylon), polyether ether ketone (PEEK), and/or combinations thereof. Concerning the present disclosure, 3D printer 400 may employ a variant of traditional inkjet printer processes. In examples, rather than depositing drops of ink, 3D printer 400 may deposit drops of any suitable type of polymer as a liquid. In examples, photopolymers may be used. In alternate examples, 3D printer 400 may be able to print with forms of polyisoprene (natural rubber). There may be a second constituent present within the suitable material, such as carbon, graphite, tungsten carbide, and the like. In-situ blending of these polymer modifiers may enhance the performance of the suitable material. Material container 408 may be any suitable size, height, and/or shape. Without limitation, a suitable shape may include, but is not limited to, cross-sectional shapes that are circular, elliptical, triangular, rectangular, square, hexagonal, and/or combinations thereof. Material container 408 may be made from any suitable material. Suitable materials may include, but are not limited to, metals, nonmetals, polymers, ceramics, and/or combinations thereof. There may be a plurality of material containers 108 to accommodate the printing of multiple materials for a desired object. In examples, the material to be used for printing may be disposed within material container 408. An information handling system may control the movement of the material from material container 408, to flow through extruder 406, and dispose upon bed plate 404.

Figure 5:
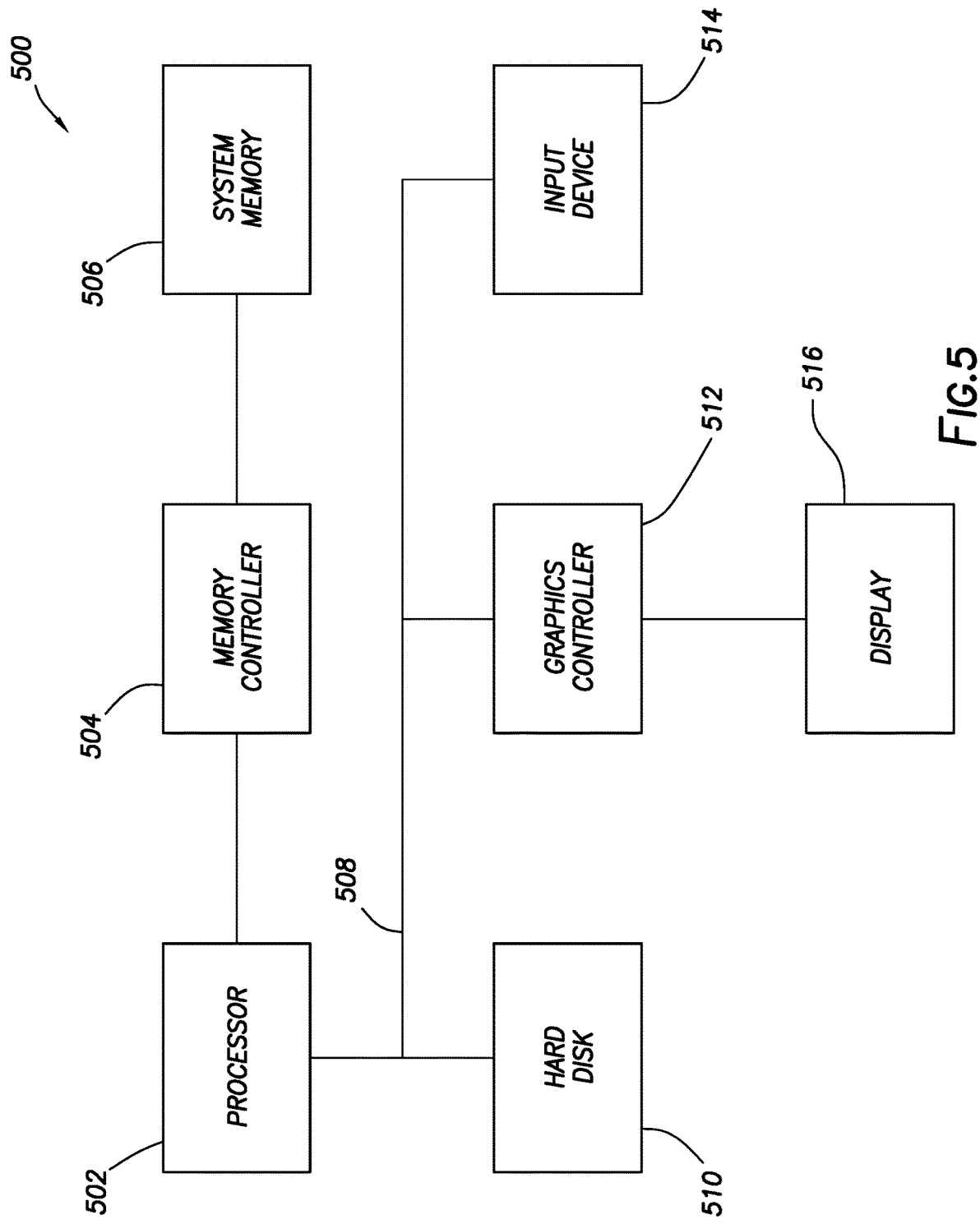
FIG. 5 illustrates an example of an information handling system.

FIG. 5 illustrates an example of an information handling system 500. Information handling system 500 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 500 may be a processing unit, a network storage device, or any other suitable device and may vary in size, shape, performance, functionality, and price. Information handling system 500 may include random access memory (RAM), one or more processing resources such as a central processing unit (CPU) or hardware or software control logic, ROM, and/or other types of nonvolatile memory. Additional components of the information handling system 500 may include one or more disk drives, one or more network ports for communication with external devices as well as an input device (e.g., keyboard, mouse, etc.) and video display. Information handling system 500 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Software for performing method steps may be stored in information handling system 500 and/or on external computer readable media. Those of ordinary skill in the art will appreciate that information handling system 500 may include hardware elements including circuitry, software elements including computer code stored on a machine-readable medium, or a combination of both hardware and software elements. Additionally, the blocks shown are but one example of blocks that may be implemented. A processor 502, such as a central processing unit or CPU, controls the overall operation of information handling system 500. The processor 502 may be connected to a memory controller 504, which may read data to and write data from a system memory 506. The memory controller 504 may have memory that includes a non-volatile memory region and a volatile memory region. The system memory 506 may be composed of a plurality of memory modules, as will be appreciated by one of ordinary skill in the art. In addition, the system memory 506 may include non-volatile and volatile portions. A system basic input-output system (BIOS) may be stored in a non-volatile portion of the system memory 506. The system BIOS may be adapted to control a start-up or boot process and to control the low-level operation of information handling system 500.

As illustrated, the processor 502 may be connected to at least one system bus 508, for example, to allow communication between the processor 502 and other system devices. The system bus may operate under a standard protocol such as a variation of the Peripheral Component Interconnect (PCI) bus or the like. In the exemplary example shown in FIG. 5, the system bus 508 may connect the processor 502 to a hard disk drive 510, a graphics controller 512 and at least one input device 514. The hard disk drive 510 may provide non-volatile storage to data that is used by information handling system 500. The graphics controller 512 may in turn be connected to a display device 516, which provides an image to a user based on activities performed by information handling system 500. The memory devices of information handling system 500, including the system memory 506 and the hard disk 510 may be tangible, machine-readable media that store computer-readable instructions to cause the processor 502 to perform a method according to an example of the present techniques.

In examples, an STL file containing the model to be printed by 3D printer 400 (referring to FIG. 4) may be received by information handling system 500. The STL file may be processed to convert the model into a series of layers, called slicing, either before or after information handling system 500 has received the STL file. In examples, information handling system 500 may contain software to slice the STL file. 3D printer 400 may use the sliced STL file to dispose the material within material container 408 (referring to FIG. 4) in a designated position in accordance with each successive layer of the model. In examples, information handling system 500 may instruct bed plate 404 (referring to FIG. 4) to move into proximity with extruder 406 (referring to FIG. 4). Information handling system 500 may control and actuate the location of extruder 406 to match that of the sliced layers within the STL file. The material disposed within material container 408 may travel from material container 408 to extruder 406. As the material travels to and through extruder 406, extruder 406 may move across bed plate 404 in accordance with the sliced STL file. As extruder 406 deposits the material onto bed plate 404, the material may be exposed to electromagnetic radiation produced by UV source 410 (referring to FIG. 4). As the material absorbs the electromagnetic radiation, the material may polymerize and cure as cross-linking occurs between polymer chains within the deposited material. Extruder 406 may continue to deposit the material into layers that build upon previously deposited material that has been cured, or is in the process of curing. In alternate examples, the curing process may be done independent from extruder 406. Curing may occur through the application of heat and/or pressure. In examples, 3D printer 400 may be capable of in-situ blending and/or depositing of at least two suitable materials. Alternatively, 3D printer 400 may be capable of simultaneous deposition of at least two suitable materials, as depicted in FIG. 4. An operator may be able to select the suitable materials to be used, the blend ratios, and the orientation of deposition within information handling system 500 in order for 3D printer 400 to be properly configured to produce the desired three-dimensional object.

Figure 6:
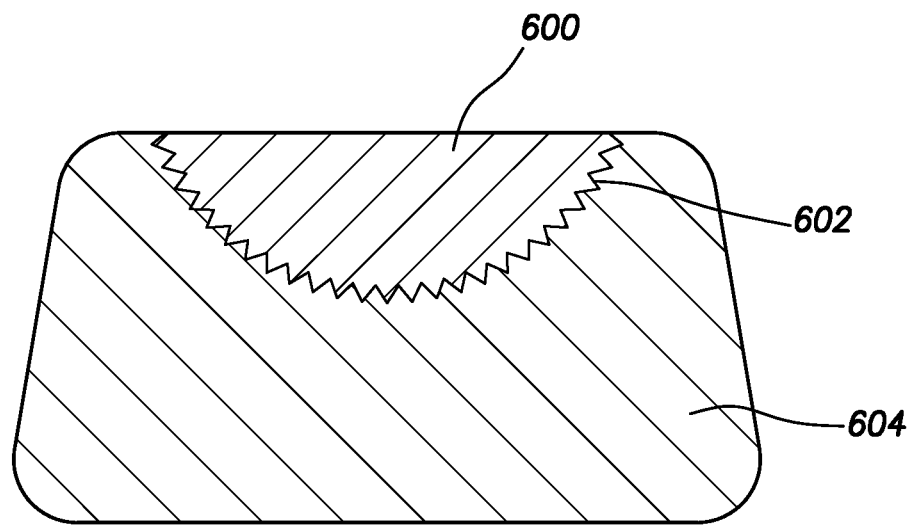
FIG. 6 illustrates an example of a material configuration.
Figure 7:
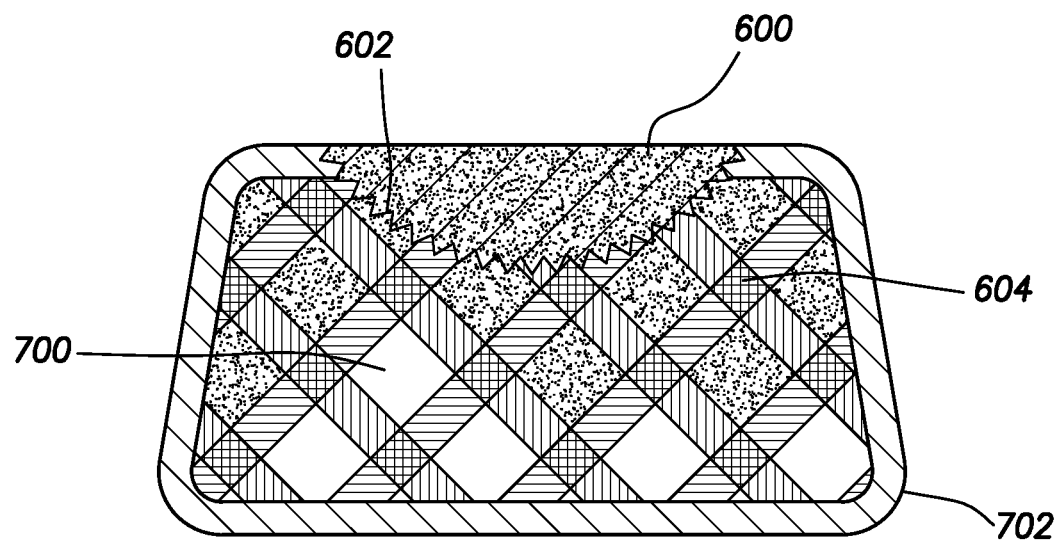
FIG. 7 illustrates an example of a material configuration.

In examples, additive manufactured objects having any suitable material configuration may be produced. Without limitation, suitable material configurations may include layered, blended, honeycombed, and voids, among others. FIGS. 6 and 7 illustrate different material configurations that may be produced, for example, by 3D printer 400 (referring to FIG. 4). As illustrated in FIG. 6, there may be a first material 600, a hybrid-zone 602, and a second material 604. First material 600 and second material 604 may be any suitable material used by 3D printer 400, as previously discussed. For example, first material 600 and/or second material 604 may include photopolymers such as polyisoprene. First material 600 may be different from second material 604. In examples, first material 600 may have a lower hardness value or a higher hardness value than second material 604. A hardness value may be defined as material ability to resist deformation. First material 600 may be separated from second material 604 by hybrid-zone 602.

Hybrid-zone 602 may be a boundary area between different materials, wherein the different materials may be integrated over the given area rather than an abrupt separation between adjacent materials. Hybrid-zone 602 may not display a distinct material separation boundary as hybrid-zone 602 may include a mixture of both first material 600 and second material 604. Hybrid zone 602 may be formed to enhance a printed object's properties. Typically, a separation boundary indicates that the separated materials have different property values. It may be beneficial to include a transitional zone between the different property values, such as in a hybrid zone 602, to better the distribution of property values of a printed object. For example, first material 600 may have a yield stress of 10 MPa, and second material 604 may have a yield stress of 50 MPa. Given an applied stress, the printed object may fail along the separation boundary between first material 600 and second material 604. In the present example, a hybrid zone 602 may be included, wherein the hybrid zone 602 has a combination of properties between first material 600 and second material 604. For example, hybrid zone 602 may have a yield stress of 30 MPa. In examples, an applied stress may not be large enough to affect hybrid zone 602. Hybrid zone 602 may be formed by selectively dispensing first material 600 and second material 604 in a current layer of printing and/or between different layers of printing. For example, a layer of printing may solely include of first material 600. A secondary layer of printing may solely include of second material 604. Subsequent layers of printing may alternate between first material 600 and second material 604 depending on the desirable width of hybrid zone 602. Once the transition between materials has been completed, 3D printer 400 (referring to FIG. 4) may dispense one of the materials in the rest of the layers to be printed. Hybrid-zone 602 may allow for an improved upon material configuration by cross-linking first material 600 with second material 604 during the printing process due to the exposure to electromagnetic radiation. Additional material configurations may produce improved upon property values and characteristics. In examples, introducing voids may be incorporated into the printing process.

In an alternate example, the model used to create the printed object may utilize a honeycombed structure. For example, a first layer of a first material 600 and a second material 604 may be deposited upon bed plate 404 (Referring to FIG. 4) in accordance with the sliced model designed by an operator. It should be noted that first material 600 and second material 604 may be used interchangeably. Both first material 600 and second material 604 may dispense through the same nozzle or there may be a nozzle for each material. Within the first layer, first material 600 may be dispensed upon bed plate 404 in a variation of a lattice structure (i.e. a honeycomb structure). Second material 604 may be dispensed upon bed plate 404 in the intermittent spaces between the lattice structure produced by first material 600. It should be noted that air may be substituted for second material 604, which may form an enclosed air pocket to produce a void or a plurality of voids, discussed below. The dispensation of first material 600 and second material 604 may occur simultaneously and/or in intervals. As subsequent layers are deposited onto bed plate 404, the widths and lengths of the structures in each layer may vary. In example, the intermittent spaces may shrink or become enlarged. Alternatively, the same honeycombed structure may be present throughout the entirety of the printed object.

As illustrated in FIG. 7, there may be a void 700. Void 700 may be purposely designed into seal elements 244, 246, 248 (referring to FIGS. 2A-2C). Void 700 may be an enclosure of air and/or a different material than the material surrounding void 700. The selective placement of a void may reduce the material use while being able to maintain the structural integrity of seal elements 244, 246, 248. There may be a plurality of voids 700. As illustrated, first material 600 may be separated from second material 604 by hybrid-zone 602. Second material 604 may include voids 700. Voids 700 may be any suitable size, height, and/or shape. Without limitation, a suitable shape may include, but is not limited to, cross-sectional shapes that are circular, elliptical, triangular, rectangular, square, hexagonal, and/or combinations thereof For example, to form a void 700 a first layer of a first material may be deposited upon bed plate 404 (Referring to FIG. 4) in accordance with the sliced model designed by an operator, where each slice may be identified as a single layer. Typically, as extruder 406 (Referring to FIG. 4) moves, the first material may dispense from it. Without limitation, the model may utilize a structure containing a void of material. In the present example, as subsequent layers are being deposited onto bed plate 404, a void may form within the printed object. Information handling system 500 (Referring to FIG. 5) may halt the flow of the first material out of the nozzle of extruder 406. The position of extruder 406 may be adjusted from the location of the void, and the first material may continue to dispense onto bed plate 404. The time needed to halt the flow of the first material and adjust the position of extruder 406 may vary depending on the current layer of operation. Void 700 may be enclosed by the first layer and a final layer. It should be noted that there may be a third material 702 incorporated into the material configuration. As illustrated, third material 702 may directly abut second material 604. Third material 702 may be different from both first material 600 and second material 604.

As illustrated in FIGS. 6 and 7, the disclosed sealing element may include any suitable material configurations designed in the model supplied to 3D printer 400. The use of 3D printer 400 to manufacture the sealing element may enable customization of placement of materials within the material configuration. As disclosed, the sealing element may include a plurality of various properties due to a combination of materials. The various properties may be localized and/or distributed throughout the sealing element. In examples, the sealing element may exhibit bulk performance characteristics of the contributing materials. Without limitation, the various properties may include high temperature strength for extrusion resistance, high elasticity for low temperature sealing, gas resistance, chemical resistance, and/or combinations thereof. In examples, the sealing element may include a variety of hardness values. The inclusion of a variety of properties within the sealing element may enable further hydrocarbon exploration and/or recovery by allowing an improved seal to withstand a wider temperature range, operate in low pressure environments, and inhibit unwanted expansion and/or contraction of the seal.

FIG. 8 illustrates an example of a downhole tool 800. In examples, downhole tool 800 may be any suitable tool disposed within wellbore 116 (e.g., referring to FIG. 1). Downhole tool 800 may include a mandrel 801 and a seal stack 802 disposed about mandrel 801. Seal stack 802 may be an assembly of individual sealing elements 804, 806, 808 used to seal off a portion of wellbore 116. Additionally, there may be other suitable material present within seal stack 802 that provides structural support for the individual sealing elements 804, 806, 808. In accordance with present embodiments, one or more of sealing elements 804, 806, 808 may include a first material and as second material. Through the use of additive manufacturing, the first material and the second material may be used in at least one of the sealing elements 804, 806, 808 enabling customization of performance and functionality for the sealing elements 804, 806, 808. The properties of the sealing elements 804, 806, 808 that can be tailored may include, but are not limited to, hardness, elasticity, gas resistance, chemical resistance, and high temperature strength, among others. As illustrated, the individual sealing elements 804, 806, 808, within seal stack 802 may be any suitable size, height, and/or shape. Without limitation, a suitable shape may include, but is not limited to, cross-sectional shapes that are circular, elliptical, triangular, rectangular, square, hexagonal, and/or combinations thereof.

As illustrated in FIG. 9, an individual sealing element 900 may be constructed, for example, by using 3D printer 400 (e.g., referring to FIG. 4). As illustrated, sealing element 900 may have a generally annular body 902. Annular body 902 may be an additive manufactured object having a first material and a second material. In some embodiments, annular body 902 may be circular and/or hollow. In examples, sealing element 900 may be designed to have various different cross-sectional shapes, as previously discussed. Without limitation, sealing element 900 may have a cross-section similar in shape to V-shape 902, D-shape 904, square 906, and/or combinations thereof FIG. 10 illustrates an example of different potential material configurations of additive manufactured objects. As illustrated, there may be a first configuration 1000 of an additive manufactured object and a second configuration 1002 of an additive manufactured object. First configuration 1000 and/or second configuration 1002 may include a first material 1004, a second material 1006, and a third material 1008. First configuration 1000 may differentiate from second configuration 1002 in that first configuration 1000 may have a gradual transition area between first material 1004, second material 1006, and third material 1008. As illustrated, second configuration 1002 may distinctly separate first material 1004, second material 1006, and third material 1008 into layers. Either first configuration 1000 and/or second configuration 1002 may be implemented using 3D printer 400 (e.g., referring to FIG. 4).

Accordingly, this disclosure may generally relate to additive manufacturing operations and, more particularly, to systems and methods for three dimensional (3D) printing a sealing element. Without limitation, the systems and methods may further be characterized by one or more of the following statements:

Statement 1. A downhole tool for use in a well, including: a mandrel; a sealing element disposed about the mandrel, wherein the sealing element includes an additive manufactured object, wherein the additive manufactured object includes a first material and a second material.

Statement 2. The downhole tool of statement 1, wherein the downhole tool includes a seal stack disposed about the mandrel, wherein the seal stack includes the sealing element and a second sealing element that includes a second additive manufactured object.

Statement 3. The downhole tool of statement 1 or statement 2, wherein the additive manufactured object has an annular body.

Statement 4. The downhole tool of any preceding statement, wherein the first material and the second material have hardnesses that vary from one another by 5 or more on the Shore A Hardness Scale.

Statement 5. The downhole tool of any preceding statement, wherein the first material and the second material are each individually selected from the group consisting of a thermoplastic, a ceramic, and a metal.

Statement 6. The downhole tool of any preceding statement, wherein the first material includes a photopolymer, and wherein the second material include another photopolymer different from the photopolymer of the first material.

Statement 7. The downhole tool of statement 6, wherein the photopolymer and the another photopolymer each include polyisoprene having different properties.

Statement 8. The downhole tool of any preceding statement, wherein the additive manufactured object further includes a hybrid zone of the first material and the second material that separates a first zone of the first material and a second zone of the second material.

Statement 9. The downhole tool of any preceding statement, wherein the additive manufactured object further includes one or voids disposed in at least one of the first material and/or the second material.

Statement 10. A method of producing a sealing element for a downhole tool, including: depositing a first layer of a first material onto a bed plate of a 3D printer; depositing a second layer of the first material on the first layer; and depositing additional layers sequentially, wherein each sequential layer is disposed on a previous layer, produce the sealing element.

Statement 11. The method of statement 10, wherein the sealing element has an annular body.

Statement 12. The method of statement 10 or statement 11, wherein the first material and the second material have hardnesses that vary from one another by 5 or more on the Shore A Hardness Scale.

Statement 13. The method of any one of statements 10-12, further including halting the flow of the first material on at least a portion of the second layer and sequential layers to form a void, wherein the void is enclosed by the first layer and a final layer.

Statement 14. The method of statement 13, wherein the void is filled with air.

Statement 15. The method of any one of statements 10-14, further including halting the flow of the first material on at least a portion of the second layer and sequential layers to form a plurality of voids filled with air and separated by a lattice structure.

Statement 16. The method of any one of statements 10-15, further including exposing the first material to electromagnetic radiation to promote polymerization.

Statement 17. The method of any one of statements 10-16, further including exposing the first material to an ultraviolet source to initiate a phase change.

Statement 18. The method of any one of statements 10-17, further including depositing additional layers of the first material or the second material sequentially, wherein each sequential layer is disposed on a previous layer.

Statement 19. The method of statement 18, further including halting the flow of the first material on at least a portion of the second layer and sequential layers to form a void, wherein the void is enclosed by the first layer and a final layer.

Statement 20. The method of statement 18, further includes halting the flow of the first material on at least a portion of the second layer and sequential layers to form a plurality of voids filled with air and separated by a lattice structure, wherein the honeycomb structure is enclosed by the first layer and a final layer.

Although the present invention and its advantages have been described in detail, it should be understood that various changes, substitutions and alterations may be made herein without departing from the spirit and scope of the invention as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "including," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method of producing a sealing element for a downhole tool, comprising:

depositing a first layer of a first material comprising a lattice structure, onto a bed plate of a 3D printer; and depositing a second material in intermittent spaces of the lattice structure; and depositing additional layers sequentially, wherein each sequential layer is disposed on a previous layer, produce the sealing element.

2. The method of claim 1, wherein the sealing element has an annular body.

3. The method of claim 1, wherein the first material and the second material have hardnesses that vary from one another by 5 or more on the Shore A Hardness Scale.

4. The method of claim 1, further comprising halting the flow of the first material on at least a portion of the second layer and sequential layers to form a void, wherein the void is enclosed by the first layer and a final layer.

5. The method of claim 4, wherein the void is filled with air.

6. The method of claim 1, further comprising forming voids between some of the additional layers.

7. The method of claim 1, further comprising exposing the first material to electromagnetic radiation to promote polymerization.

8. The method of claim 1, further comprising exposing the first material to an ultraviolet source to initiate a phase change.

9. The method of claim 1, further comprising depositing additional layers of the first material or the second material sequentially, wherein each sequential layer is disposed on a previous layer.

10. The method of claim 9, further comprising forming a void between the additional layers, wherein the void is adjacent to a final layer.

11. The method of claim 9, further comprises forming a plurality of voids filled with air between some of the additional layers.

12. The method of claim 1, wherein the first and second layers include photopolymers.

13. The method of claim 1, further comprising cross-linking the first material with the second material.

14. The method of claim 1, further comprising forming an additional layer with the first material, the second material, and a third material.

15. The method of claim 1, further comprising exposing the first material to radiation.

16. The method of claim 15, further comprising promoting polymerization of the first material with the radiation.

17. The method of claim 9, wherein depositing the additional layers sequentially comprises depositing a thermoplastic, a ceramic, or a metal.

18. The method of claim 9, wherein depositing the additional layers sequentially comprises depositing at least a polymer.

19. The method of claim 1, wherein depositing the additional layers sequentially comprises depositing different materials.

20. The method of claim 1, further comprising forming at least one void in at least one layer.

* * * * *